United States Patent
Mori

(10) Patent No.: US 7,521,839 B2
(45) Date of Patent: Apr. 21, 2009

(54) EXCITING METHOD FOR ELASTIC VIBRATION MEMBER AND VIBRATORY DRIVING DEVICE

(75) Inventor: Hiroyuki Mori, Kanagawa (JP)

(73) Assignee: Sony Corporation (JP)

( * ) Notice: Subject to any disclaimer, the term of this patent is extended or adjusted under 35 U.S.C. 154(b) by 79 days.

(21) Appl. No.: 11/651,418

(22) Filed: Jan. 9, 2007

(65) Prior Publication Data

US 2007/0182281 A1    Aug. 9, 2007

(30) Foreign Application Priority Data

Jan. 10, 2006    (JP)    ............................ P2006-002111

(51) Int. Cl.
  *H01L 41/08*    (2006.01)
(52) U.S. Cl. .................. 310/323.02; 310/367
(58) Field of Classification Search ............ 310/323.02, 310/328
  See application file for complete search history.

(56) References Cited

U.S. PATENT DOCUMENTS

| | | | |
|---|---|---|---|
| 4,613,782 A | | 9/1986 | Mori et al. |
| 5,191,688 A | * | 3/1993 | Takizawa et al. ............ 29/25.35 |
| 5,900,691 A | * | 5/1999 | Reuter et al. ................. 310/348 |
| 6,066,911 A | * | 5/2000 | Lindemann et al. .... 310/323.02 |
| 6,492,760 B1 | * | 12/2002 | Matsuda et al. ......... 310/323.02 |
| 6,657,362 B2 | * | 12/2003 | Matsuo et al. .......... 310/323.02 |
| 6,661,154 B2 | * | 12/2003 | Shibatani ................ 310/316.01 |
| 6,771,004 B1 | * | 8/2004 | Matsuda et al. .............. 310/328 |
| 6,856,072 B2 | * | 2/2005 | Kosaka et al. .......... 310/323.02 |
| 6,927,527 B2 | * | 8/2005 | Nakanishi ............... 310/323.02 |
| 2002/0067105 A1 | | 6/2002 | Kosaka et al. |
| 2005/0029875 A1 | | 2/2005 | Sasaki et al. |

FOREIGN PATENT DOCUMENTS

| | | |
|---|---|---|
| JP | 58-093477 | 6/1983 |
| JP | 03-195380 | 8/1991 |
| JP | 6-106028 B2 | 12/1994 |
| JP | 2004-320846 A | 11/2004 |

* cited by examiner

*Primary Examiner*—Mark Budd
(74) *Attorney, Agent, or Firm*—Lerner, David, Littenberg, Krumholz & Mentlik, LLP

(57) ABSTRACT

Disclosed herein is an exciting method for an elastic vibration member which may include arranging two support members each formed from an electro-mechanical energy transducer; supporting the elastic vibration member to the two support members at their front ends; and supplying drive signals having the same frequency and a phase difference to the two support members, circularly or elliptically vibrating the elastic vibration member.

23 Claims, 11 Drawing Sheets

EXCITING METHOD FOR ELASTIC VIBRATION MEMBER AND VIBRATORY DRIVING DEVICE

CROSS-REFERENCE TO RELATED APPLICATIONS

This application claims priority from Japanese Patent Application No. JP 2006-002111 filed in the Japanese Patent Office on Jan. 10, 2006, the entire content of which is incorporated herein by reference.

BACKGROUND OF THE INVENTION

1. Field of the Invention

The present invention relates to an exciting method for an elastic vibration member and a vibratory driving device.

2. Description of the Related Art

In the past proposed is an exciting method for an elastic vibration member in a vibratory driving device for linear or rotational motion.

For example, a first technique in the related art mentioned below is proposed. This technique includes an elastic vibration member, a drive member having at least two electrodes and an electro-mechanical energy transducer for exciting the elastic vibration member by applying drive voltages having the same frequency and two phases to these two electrodes, and a driven member kept in contact with the elastic vibration member. The drive member forms a first bending vibration mode by the input of the drive voltages having the same phase, and also forms a second bending vibration mode by the input of the drive voltages having opposite phases. By the combination of these two bending vibration modes, a circular or elliptical motion is produced in the elastic vibration member (see Japanese Patent Laid-open No. 2004-320846 referred to as Patent Document 1).

A second technique in the related art mentioned below is also proposed. This technique includes a square bar-shaped elastic base, a plurality of drive elements projecting from one side surface of the base at given positions, and an elastic vibration member connected to the base. By applying an alternating voltage to the base, bending resonance and longitudinal resonance are simultaneously produced in the base. By the combination of these bending and longitudinal vibration modes, a circular or elliptical motion is produced in the elastic vibration member (see Japanese Patent Publication No. 6-106028 referred to as Patent Document 2).

However, according to Patent Document 1, two bending vibration modes are combined so as to excite the elastic vibration member in a circular or elliptical motion.

Usually, the resonant frequencies in the two bending vibration modes are not equal to each other. Further, it is not ensured that the frequency ranges of these two bending vibration modes are adjacent to each other. To make the resonant frequencies in the two bending vibration modes equal to each other, adjustment (degeneration) of the size, shape, thickness, etc. of the elastic vibration member may be required, causing a limitation to the shape of the elastic vibration member and a difficulty of design.

In Patent Document 2, the bending vibration mode and the longitudinal vibration mode are combined. Accordingly, the use of the longitudinal vibration mode (vertical vibration) generally causes an increase in resonant frequency, which is impractical. Further, when the longitudinal size of the elastic vibration member is reduced, a further increase in resonant frequency is undesirably invited.

Moreover, both in Patent Document 1 and 2, a circular or elliptical motion as a driving force can be produced by combining the two vibration modes, or exciting the two vibration modes. Accordingly, precise control of the driving frequency and a limitation to the driving frequency are necessary. Further, a limitation to the shape and size of the elastic vibration member and a dimensional accuracy in working the elastic vibration member are necessary for the excitation of the two vibration modes at near frequencies, causing an increase in cost.

SUMMARY OF THE INVENTION

The present invention provides a vibratory driving device which can be designed easily and flexibly at a low cost.

In accordance with a first embodiment of the present invention, there is provided an exciting method for an elastic vibration member including the steps of arranging two support members each formed from an electro-mechanical energy transducer; supporting the elastic vibration member to the two support members at their front ends; and supplying drive signals having the same frequency and a phase difference to the two support members, thereby circularly or elliptically vibrating the elastic vibration member.

In accordance with a second embodiment of the present invention, there is provided a vibratory driving device including a base; two support members supported to the base, each of the two support members being formed from an electro-mechanical energy transducer; an elastic vibration member supported to the two support members at their front ends; and control means for inputting drive signals having the same frequency and a phase difference to the two support members.

In accordance with a third embodiment of the present invention, there is provided a vibratory driving device including a base; two support members supported to the base and extending in parallel to each other, each of the two support members being formed from an electro-mechanical energy transducer; an elastic vibration member supported to the two support members at their front ends; and control means for inputting drive signals having the same frequency and a phase difference to the two support members; the elastic vibration member being formed with a projecting portion at a position between the front ends of the two support members, the projecting portion projecting on one side of the elastic vibration member opposite to the other side where the two support members are arranged; a driven member being supported in opposed relationship to the projecting portion so as to be movable in a plane perpendicular to the longitudinal direction of the two support members; the vibratory driving device further including pressure applying means for bringing the driven member into pressure contact with the projecting portion.

In accordance with a fourth embodiment of the present invention, there is provided a vibratory driving device movably supported between a driven member and a pressure rail extending in parallel to each other, including a base kept in slidable contact with the pressure rail; two support members supported to the base and extending in parallel to each other in a direction perpendicular to the longitudinal direction of the driven member and the pressure rail and being formed from an electro-mechanical energy transducer; an elastic vibration member supported to the two support members at their front ends; and control means for inputting drive signals having the same frequency and a phase difference to the two support members; the elastic vibration member being formed with a projecting portion at a position between the front ends of the two support members, the projecting portion projecting toward the driven member; the vibratory driving device further including pressure applying means for bringing the driven member into pressure contact with the projecting portion.

According to an embodiment of the present invention, the drive signals having the same frequency and a phase difference are respectively supplied to the two support members to thereby excite the elastic vibration member, so that the elastic vibration member can be reliably vibrated circularly or elliptically.

Accordingly, it is necessary to combine two vibration modes, but a stretch mode as a single vibration mode is used in the present invention, so that the vibratory driving device can be designed easily and flexibly, and it is possible to ensure the flexibility of choice of the shape, size, and material of the elastic vibration member.

Further, since the shape and size of the elastic vibration member are less limited, a cost reduction can be expected.

Further, since the projecting portion and the driven member are kept in pressure contact with each other by the pressure applying means, the motion of the driven member due to the circular or elliptical vibration of the projecting portion can be reliably produced.

DETAILED DESCRIPTION OF THE PREFERRED EMBODIMENTS

First Preferred Embodiment

Preferred embodiments of the present invention will now be described with reference to the attached drawings.

Figure 1:
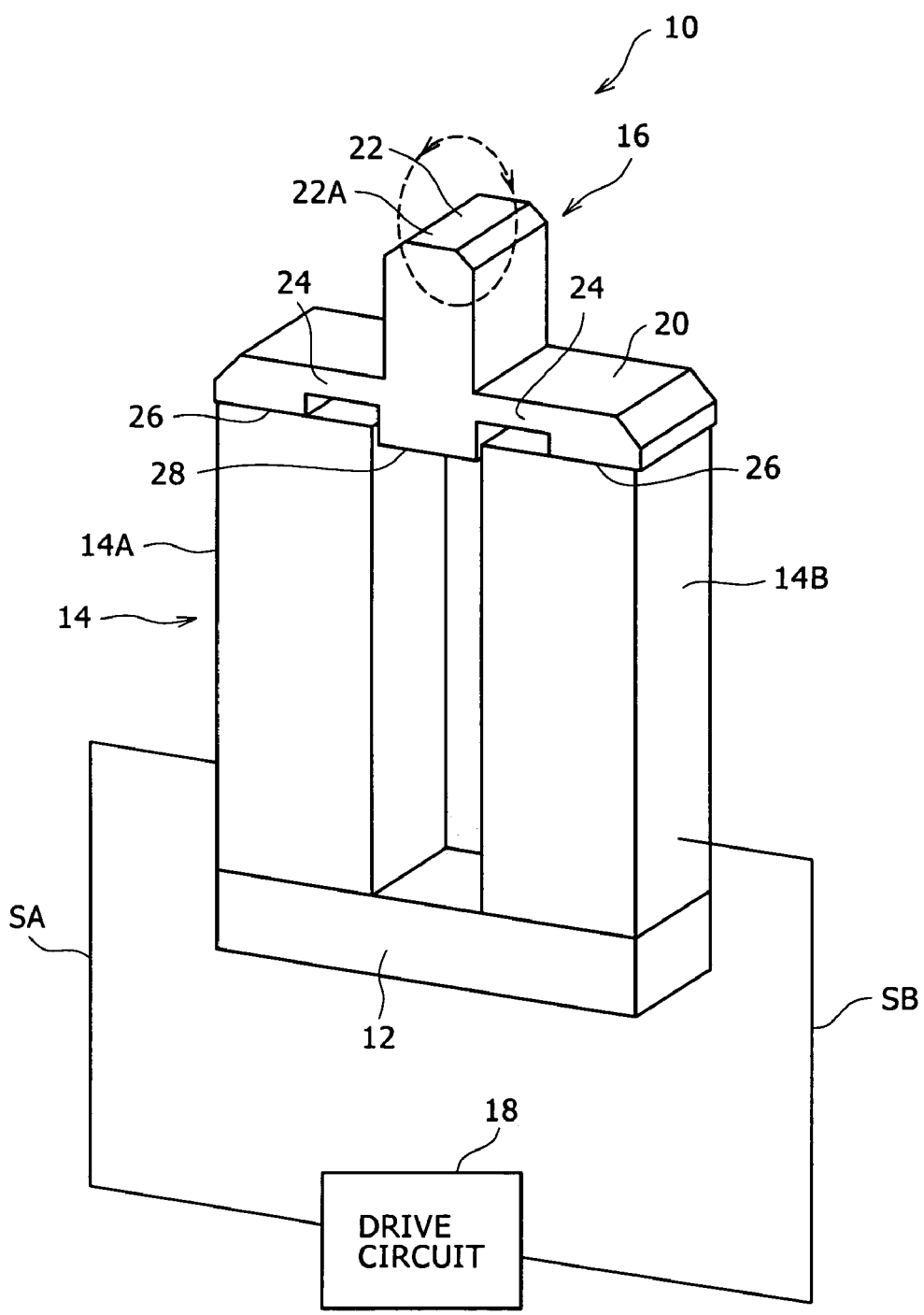
FIG. 1 is a perspective view of a vibratory driving device according to a first preferred embodiment of the present invention.

FIG. 1 is a perspective view of a vibratory driving device 10 according to the first preferred embodiment.

As shown in FIG. 1, the vibratory driving device 10 includes a base 12, two support members 14, an elastic vibration member 16, and a drive circuit 18 (corresponding to the control section in the present invention).

The base 12 is an elongated rectangular plate member and has an upper surface having an area enough to mount the lower ends of the two support members 14.

The base 12 is formed of a metal material such as brass.

Each of the two support members 14 is a columnar member having a rectangular cross section and a height larger than the length of each side of the rectangular cross section. The sectional shape of each support member 14 is not limited to such a rectangular shape as in this preferred embodiment, but any other shapes such as a circular shape may be adopted in the present invention. Further, it is not necessary to set the height of each support member 14 larger than the length of each side of the rectangular cross section. However, it is advantageous that the columnar shape having such a larger height as in this preferred embodiment can increase the amplitude of vibration.

The lower ends of the two support members 14 are fixed by an adhesive to the upper surface of the base 12 at its longitudinal opposite ends. The two support members 14 extend in parallel to each other in a direction perpendicular to the upper surface of the base 12.

Each support member 14 is formed from an electro-mechanical energy transducer expanding and contracting along the height according to an input drive signal. For example, a stacked piezoelectric element may be used as the electro-mechanical energy transducer.

In this preferred embodiment, the two support members 14 have the same shape and size, and each support member 14 has a size of 1.65 mm for each side of the rectangular cross section and a height of 5 mm.

For the convenience of illustration, one of the two support members 14 will be referred to as a first support member 14A and the other will be referred to as a second support member 14B.

The elastic vibration member 16 has a body plate portion 20 and a projecting portion 22.

The body plate portion 20 is an elongated plate member having a thickness, a width larger than the thickness, and a length larger than the width.

The body plate portion 20 is composed of a first thick-walled portion, a first thin-walled portion, a second thick-walled portion, a second thin-walled portion, and a third thick-walled portion arranged in this order in the longitudinal direction of the body plate portion 20.

More specifically, the lower surface of the body plate portion 20 is formed with two recesses 23 on the longitudinally opposite sides of a longitudinally central portion of the body plate portion 20, thereby forming two thin-walled portions 24 (the first and second thin-walled portions mentioned above) respectively corresponding to the two recesses 23. Each thin-walled portion 24 is lower in rigidity than the other portion of the body plate portion 20.

Further, as the result of the formation of the two recesses 23, two first projections 26 (the first and third thick-walled portions mentioned above) are formed on the lower surface of the body plate portion 20 at the longitudinally opposite ends.

Further, a second projection 28 (the second thick-walled portion mentioned above) higher than each first projection 26 is formed on the lower surface of the body plate portion 20 at the longitudinally central position between the two recesses 23.

The projecting portion 22 projects from the upper surface of the body plate portion 20 at the longitudinally central position.

The projecting portion 22 has an upper end 22A adapted to abut against a driven member to be moved by vibration of the projecting portion 22.

In this preferred embodiment, the projecting portion 22 has the same sectional shape as that of the second projection 28 and is aligned to the second projection 28.

The elastic vibration member 16 is mounted on the two support members 14 in the following manner.

The second projection 28 is inserted between the upper end portions of the two support members 14, so that the opposite side surfaces of the second projection 28 abut against the opposed side surfaces of the upper end portions of the two support members 14, thereby positioning the elastic vibration member 16 with respect to the two support members 14 in the longitudinal direction of the base 12.

The lower surfaces of the first projections 26 are bonded by an adhesive to the upper end surfaces of the two support members 14.

In this preferred embodiment, the elastic vibration member 16 is formed of brass. Further, the body plate portion 20 has a width of 1.7 mm and a length of 4.8 mm. The height from the lower surface of the second projection 28 to the upper end 22A of the projecting portion 22 is set to 2 mm.

The drive circuit 18 functions to supply a first drive signal SA and a second drive signal SB to the first support member 14A and the second support member 14B, respectively, and constitutes the control section in the present invention.

In this preferred embodiment, alternating voltages are used as the first and second drive signals SA and SB.

The operating principles of the vibratory driving device 10 will now be described.

According to the computer analysis using a finite element method, the elastic vibration member 16 can be excited at a frequency of about 70 to 74 kHz in the case of vibrating the first and second support members 14A and 14B in a stretch mode.

The projecting portion 22 is located in the vicinity of a position where a crest or trough is formed during vibration in the stretch mode. Accordingly, the projecting portion 22 can be displaced at the maximum in the stretching direction.

When the drive signal SA having a frequency near the resonant frequency in the stretch mode is applied to the first support member 14A, and the drive signal SB having the same frequency and phase as those of the drive signal SA is applied to the second support member 14B, the first and second support members 14A and 14B are excited simultaneously in the stretch mode.

In this case, the projecting portion 22 simply vibrates in the vertical direction.

Figure 2:
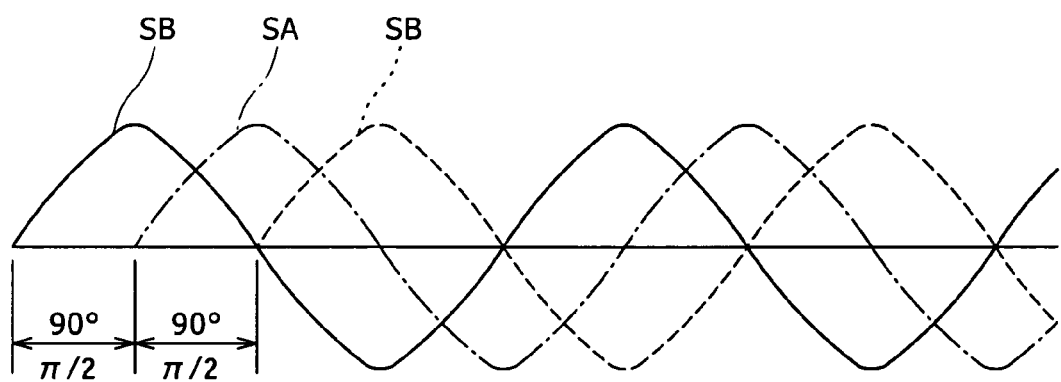
FIG. 2 is a schematic diagram illustrating first and second drive signals.
Figure 3:
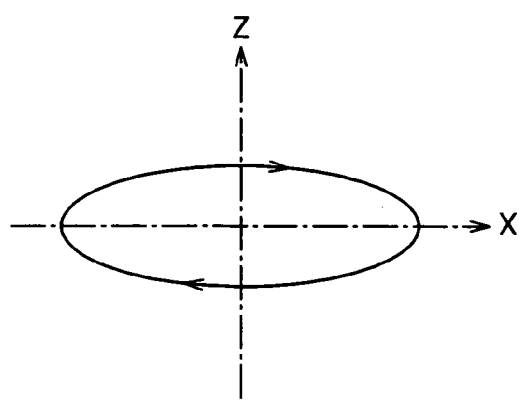
FIGS. 3 and 4 are schematic diagrams illustrating the loci of elliptical motions of a projecting portion under different conditions.
Figure 4:
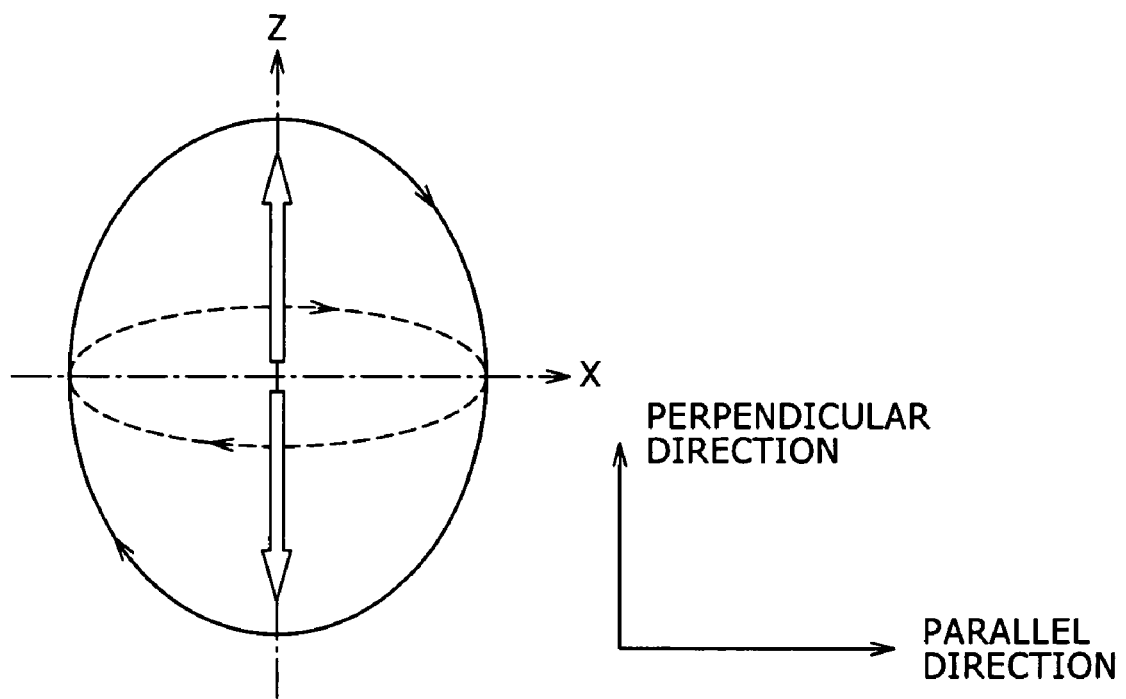

In the case that the drive signals SA and SB to be applied to the first and second support members 14A and 14B have a phase angle (phase difference), the operation of the vibratory driving device 10 is as follows:

FIG. 2 illustrates the first and second drive signals SA and SB, and FIGS. 3 and 4 illustrate the loci of elliptical motions of the projecting portion 22 under different conditions.

As shown in FIG. 2, the second drive signal SB having the same frequency and amplitude as those of the first drive signal SA is supplied to the second support member 14B so that the phase angle between the first and second drive signals SA and SB becomes about $\pi/2$ (90 degrees) or about $-\pi/2$ (-90 degrees) by the drive circuit 18. In this case, the projecting portion 22 of the elastic vibration member 16 is circularly or elliptically vibrated by the stretch displacement (expansion and contraction) of the first and second support members 14A and 14B as shown in FIG. 3.

FIG. 3 shows the case that the frequency of the drive signals SA and SB is different from the resonant frequency in the stretch mode. In this case, the projecting portion 22 is elliptically vibrated so as to describe a flattened ellipse having a major axis perpendicular to the vertical direction (Z direction) and parallel to the horizontal direction (X direction) along which the first and second support members 14A and 14B are arranged.

In this case, the vibrational component in the vertical direction (Z direction) along which the projecting portion 22 pushes the driven member is insufficient, so that a driving force may not be ensured.

To cope with this problem, the frequency of the drive signals SA and SB to be applied to the first and second support members 14A and 14B is set substantially equal to the resonant frequency in the stretch mode. As a result, the stretch mode is excited in the elastic vibration member 16, so that the vibrational moment in the vertical direction (z direction) is increased as shown in FIG. 4, thereby producing a stable driving force.

Further, by setting the phase angle of the drive signal SB to be applied to the second support member 14B to about $\pi/2$ or about $-\pi/2$, the rotational direction of the circular or elliptical vibration can be set clockwise for the phase angle of about $\pi/2$ or anticlockwise for the phase angle of about $-\pi/2$.

Further, by bringing the driven member into pressure contact with the projecting portion 22 of the elastic vibration member 16 through any pressure applying section, the moving direction of the driven member can be inverted.

Accordingly, the driving and inverting operations of the vibratory driving device 10 can be performed by using only one vibration mode (stretch mode).

The amplitudes of the drive signals SA and SB to be applied to the first and second support members 14A and 14B are not necessarily set equal to each other, depending on the use mode of the vibratory driving device 10.

The resonant frequency in the stretch mode excited in the support members 14 will now be described.

In the case that the thickness of each thin-walled portion 24 formed between the projecting portion 22 of the elastic vibration member 16 and each support member 14 is set to 0.3 mm, the resonant frequency in the stretch mode is 71.7 kHz according to the computer analysis.

When the thickness of each thin-walled portion 24 is changed to 0.2 mm, the resonant frequency in the stretch mode can be reduced to 54.8 kHz according to the computer analysis.

When the material of the elastic vibration member 16 is changed from brass to stainless steel and the thickness of each thin-walled portion 24 is changed to 0.195 mm, the resonant frequency in the stretch mode can be made substantially equal to 71.7 kHz according to the computer analysis.

In this manner, the resonant frequency in the stretch mode can be adjusted by changing the shape and/or material of the elastic vibration member 16.

The thin-walled portions 24 of the elastic vibration member 16 are not essential. However, the formation of the thin-walled portions 24 in the elastic vibration member 16 can reduce the rigidity at the thin-walled portions 24, thereby attaining easy excitation of the elastic vibration member 16.

According to this preferred embodiment, the elastic vibration member 16 is excited by respectively supplying the drive signals SA and SB to the two support members 14A and 14B and thereby vibrating these support members 14A and 14B in the stretch mode. Accordingly, circular or elliptical vibration can be reliably produced in the elastic vibration member 16.

Accordingly, unlike the related art, it is not necessary to combine two vibration modes, but only the stretch mode as a single vibration mode is used, thereby facilitating the design with ease and ensuring the flexibility of design. Further, the flexibility of choice of the shape, size, and material of the elastic vibration member 16 can be ensured.

Since only the stretch mode as a single vibration mode is used, the flexibility of setting of the resonant frequency can be ensured. Accordingly, by reducing the resonant frequency, the frequency of the drive signals to be supplied to the support members 14 can be reduced to thereby reduce a power consumption.

Further, since the shape and size of the elastic vibration member 16 is less limited, a cost reduction can be expected.

Further, by changing the polarity of the phase difference between the two drive signals to be supplied to the two support members 14 (i.e., by inverting the advance or retard of the phase of the drive signal SB with respect to the drive signal SA), the rotational direction of the circular or elliptical vibration can be inverted in spite of the use of only one vibration mode (stretch mode), so that the flexibility of design can be further ensured.

Second Preferred Embodiment

A second preferred embodiment of the present invention will now be described with reference to FIG. 5.

In the second preferred embodiment, the vibratory driving device 10 is applied to a driven member 30, thereby constructing a mechanism for linearly reciprocating the driven member 30.

Figure 5:
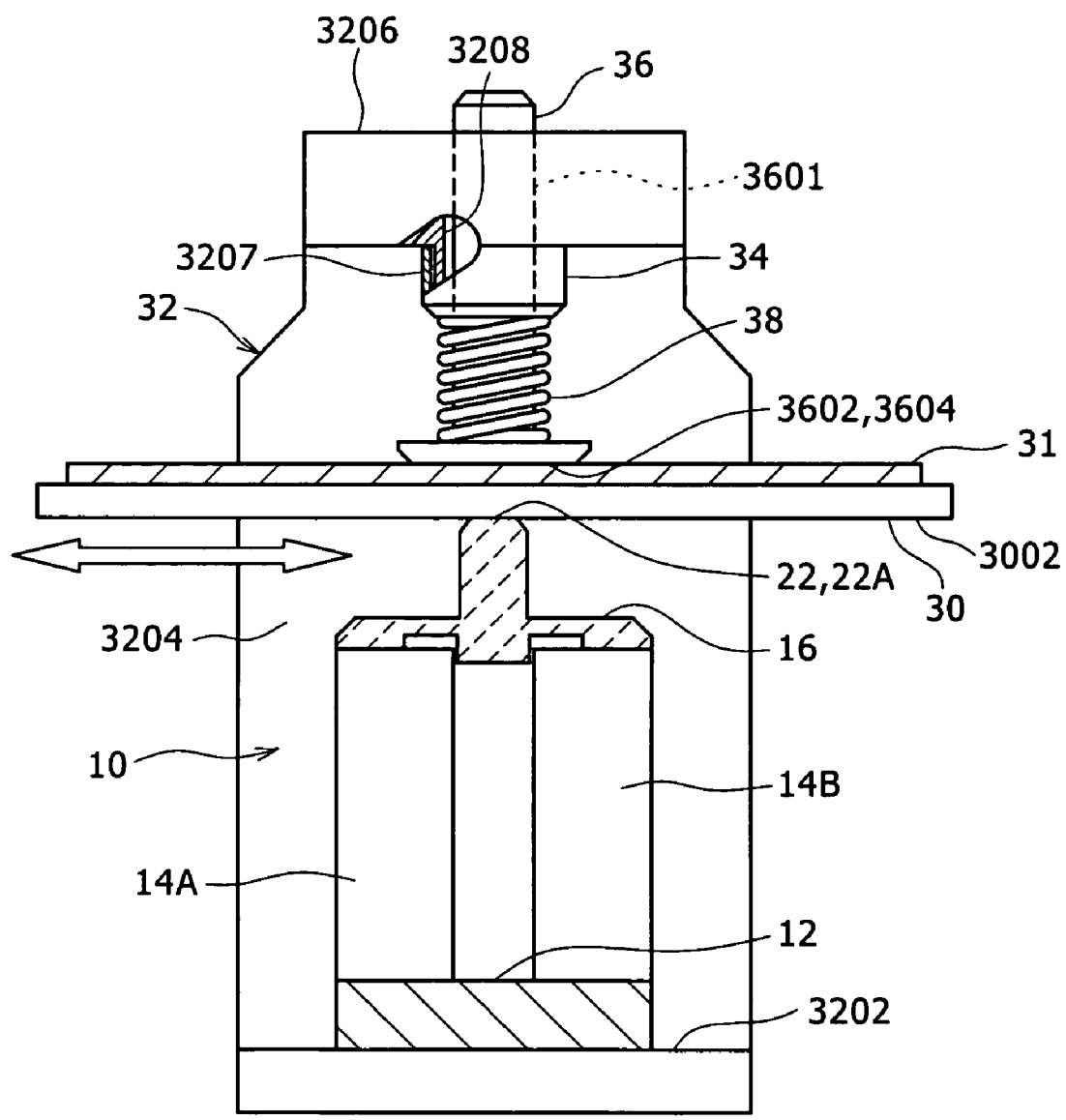
FIG. 5 is a partially sectional elevation of a vibratory driving device according to a second preferred embodiment of the present invention.

FIG. 5 is a partially sectional elevation of the vibratory driving device 10 and its associated parts constituting the above mechanism according to the second preferred embodiment. In FIG. 5, substantially the same parts or members as those of the first preferred embodiment are denoted by the same reference numerals.

As shown in FIG. 5, the driven member 30 is a flat elongated plate member supported so as to be reciprocatable in its longitudinal direction.

A sliding surface member 31 is formed on the upper surface of the driven member 30. The sliding surface member 31 is formed of a material having a low coefficient of friction, such as a resin material.

A holding stay 32 is provided in the vicinity of the driven member 30.

The holding stay 32 has a bottom wall 3202 located below the driven member 30, a vertical wall 3204 standing from the bottom wall 3202, and a top wall 3206 projecting from the vertical wall 3204 and located above the driven member 30.

The vibratory driving device 10 shown in FIG. 5 is held by the holding stay 32 in such a manner that the base 12 is mounted on the upper surface of the bottom wall 3202 and the upper end 22A of the projecting portion 22 abuts against the lower surface 3002 of the driven member 30 in the condition where the first and second support members 14A and 14B extend in a direction perpendicular to the lower surface 3002 of the driven member 30 and are arranged in the longitudinal direction of the driven member 30 (the direction of reciprocating motion of the driven member 30).

A cylindrical external threaded portion 3207 projects from the lower surface of the top wall 3206 at a position directly above the projecting portion 22, and a through hole 3208 is formed through the top wall 3206 and the external threaded portion 3207.

A pressure nut 34 is threadedly engaged with the external threaded portion 3207.

A pressure shaft 36 is inserted at its shaft portion 3601 through the through hole 3208, and a circular plate portion 3602 larger in diameter than the shaft portion 3601 of the pressure shaft 36 is formed at the lower end of the shaft portion 3601.

A coil spring 38 is mounted so as to surround the shaft portion 3601 at a position below the pressure nut 34 in such a manner as to be held between the circular plate portion 3602 and the pressure nut 34 under compression.

The circular plate portion 3602 is biased toward the projecting portion 22 by a biasing force of the coil spring 38, so that the lower surface of the circular plate portion 3602 as a contact surface 3604 is kept in elastic contact with the sliding surface member 31, thereby bringing the driven member 30 into pressure contact with the upper end 22A of the projecting portion 22.

By rotating the pressure nut 34, the biasing force of the coil spring 38 applied to the circular plate portion 3602 can be adjusted to thereby adjust the pressure applied from the driven member 30 to the projecting portion 22.

In the second preferred embodiment, the coil spring 38 and the pressure shaft 36 constitute pressure applying section configured to bring the driven member 30 into pressure contact with the projecting portion 22.

As in the first preferred embodiment, the drive signals SA and SB are respectively supplied to the support members 14A and 14B of the vibratory driving device 10, thereby circularly or elliptically vibrating the projecting portion 22, so that the driven member 30 can be linearly reciprocated in the direction shown by the double-headed arrow in FIG. 5.

According to the second preferred embodiment, effects similar to those of the first preferred embodiment can be exhibited. Moreover, the projecting portion 22 and the driven member 30 are kept in pressure contact with each other by the pressure applying section, so that the reciprocating motion of the driven member 30 due to the circular or elliptical vibration of the projecting portion 22 can be reliably produced.

Even in the condition that the drive signals are not supplied to the support members 14, the projecting portion 22 and the driven member 30 are kept in pressure contact with each other by the pressure applying section, thereby holding the driven member 30 in position. Accordingly, a power consumption can be reduced.

Thus, the projecting portion 22 and the driven member 30 are kept in pressure contact with each other by the pressure applying section. Accordingly, the motion of the driven member 30 is started simultaneously with starting of the circular or elliptical vibration of the projecting portion 22. That is, no backlash is present and the responsiveness of the motion of the driven member 30 can therefore be improved.

The contact surface 3604 of the pressure shaft 36 is kept in pressure contact with the sliding surface member 31 to press the driven member 30 against the projecting portion 22. Accordingly, a frictional force between the contact surface 3604 and the driven member 30 can be reduced by the sliding surface member 31, thereby increasing the efficiency of the motion of the driven member 30.

While the coil spring 38 is used as a component of the pressure applying section in the second preferred embodiment, a leaf spring, magnetic spring, and elastic member and the like may be used.

Further, a lubricant may be applied for the purpose of further reduction in frictional load between the contact surface 3604 and the sliding surface member 31.

As a modification, a cross roller guide (linear rolling bearing) or the like may be provided at the lower end of the pressure shaft 36 in place of the sliding surface member 31, thereby further reducing the frictional resistance due to the pressure applied to the driven member 30.

Third Preferred Embodiment

A third preferred embodiment of the present invention will now be described with reference to FIG. 6.

The third preferred embodiment is different from the second preferred embodiment in the point that the driven member 30 is not linearly moved, but is rotationally moved.

Figure 6:
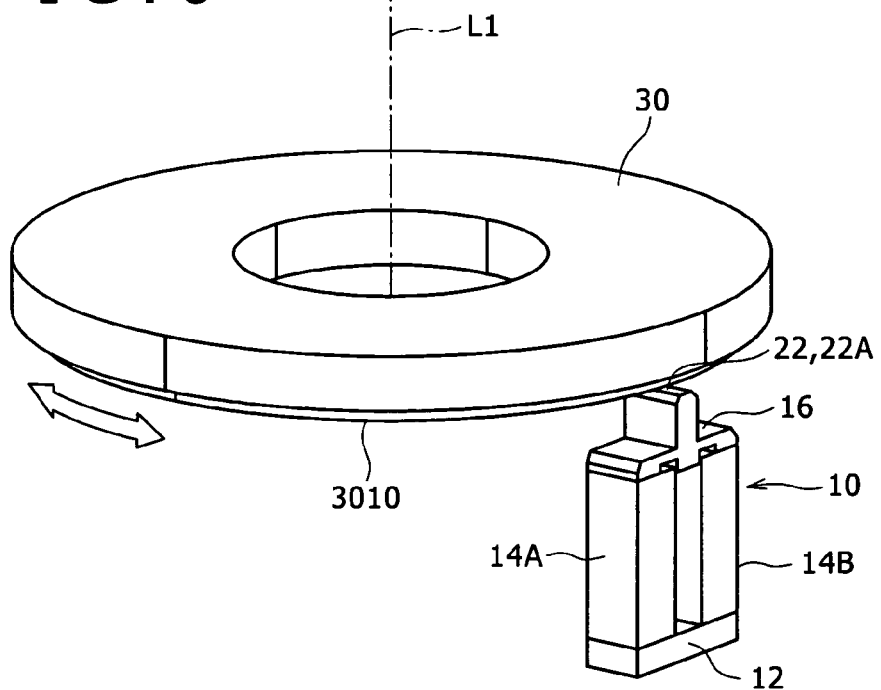
FIG. 6 is a perspective view of a vibratory driving device according to a third preferred embodiment of the present invention.

FIG. 6 is a perspective view of the vibratory driving device 10 and the driven member 30 according to the third preferred embodiment.

As shown in FIG. 6, the driven member 30 is a flattened annular member having an axial end surface 3010 as the lower surface of the driven member 30, and the driven member 30 is supported so as to be rotatable about an axis L1.

The vibratory driving device 10 shown in FIG. 6 is held in such a manner that the upper end 22A of the projecting portion 22 abuts against the axial end surface 3010 of the driven member 30 at a position near the outer circumference thereof in the condition where the first and second support members 14A and 14B extend in a direction perpendicular to the axial end surface 3010 of the driven member 30 and are arranged in a direction tangential to the outer circumference of the driven member 30.

Although not shown, pressure applying section similar to that in the second preferred embodiment is provided. The description of the pressure applying section in the third preferred embodiment will be omitted herein because of similarity in configuration.

As in the first preferred embodiment, the drive signals SA and SB are respectively supplied to the support members 14A and 14B of the vibratory driving device 10, thereby circularly or elliptically vibrating the projecting portion 22, so that the driven member 30 can be rotationally moved about the axis L1 as shown by the double-headed arrow in FIG. 6.

According to the third preferred embodiment, effects similar to those of the second preferred embodiment can be exhibited.

For example, the driven member 30 to be rotationally driven by the vibratory driving device 10 may be applied to a cam cylinder adapted to be rotated to linearly drive a movable lens frame and a linear guide cylinder along an optical axis in a lens barrel of an imaging device, or may be applied to an arrow wheel for use with an iris diaphragm.

Fourth Preferred Embodiment

A fourth preferred embodiment of the present invention will now be described with reference to FIG. 7.

The fourth preferred embodiment is a modification of the third preferred embodiment.

Figure 7:
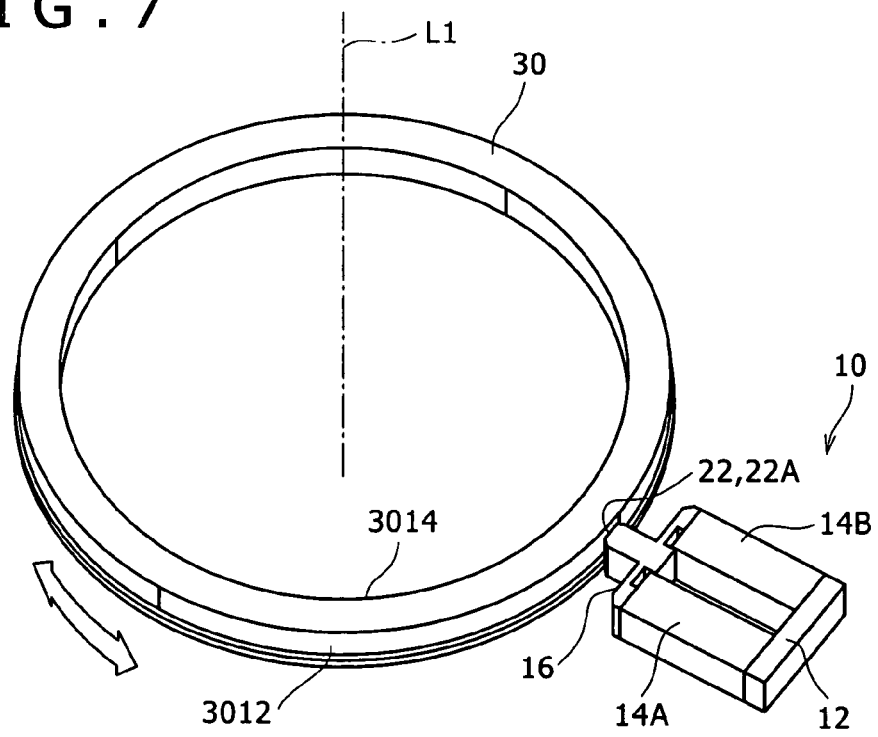
FIG. 7 is a perspective view of a vibratory driving device according to a fourth preferred embodiment of the present invention.

FIG. 7 is a perspective view of the vibratory driving device 10 according to the fourth preferred embodiment.

As shown in FIG. 7, the fourth preferred embodiment is different from the third preferred embodiment in the point that the projecting portion 22 of the vibratory driving device 10 abuts against the outer circumferential surface 3012 of the driven member 30 in the radial direction thereof. The other configuration is similar to that of the third preferred embodiment.

The vibratory driving device 10 is held in such a manner that the upper end 22A of the projecting portion 22 abuts against the outer circumferential surface 3012 of the driven member 30 in the condition where the first and second support members 14A and 14B extend in a direction perpendicular to a direction tangential to the outer circumferential surface 3012 of the driven member 30 and are arranged in this tangential direction.

Although not shown, pressure applying section similar to that in the second preferred embodiment is provided. The description of the pressure applying section in the fourth preferred embodiment will be omitted herein because of similarity in configuration.

As in the first preferred embodiment, the drive signals SA and SB are respectively supplied to the support members 14A and 14B of the vibratory driving device 10, thereby circularly or elliptically vibrating the projecting portion 22, so that the driven member 30 can be rotationally moved about the axis L1 as shown by the double-headed arrow in FIG. 7.

According to the fourth preferred embodiment, effects similar to those of the second preferred embodiment can be exhibited.

As a modification, the projecting portion 22 of the vibratory driving device 10 may be so arranged as to abut against the inner circumferential surface 3014 of the driven member 30 rather than the outer circumferential surface 3012.

Fifth Preferred Embodiment

A fifth preferred embodiment of the present invention will now be described with reference to FIG. 8.

The fifth preferred embodiment is different from the second to fourth preferred embodiments in the point that a driven member 40 is not moved by the vibratory driving device 10, but the vibratory driving device 10 itself moves.

Figure 8:
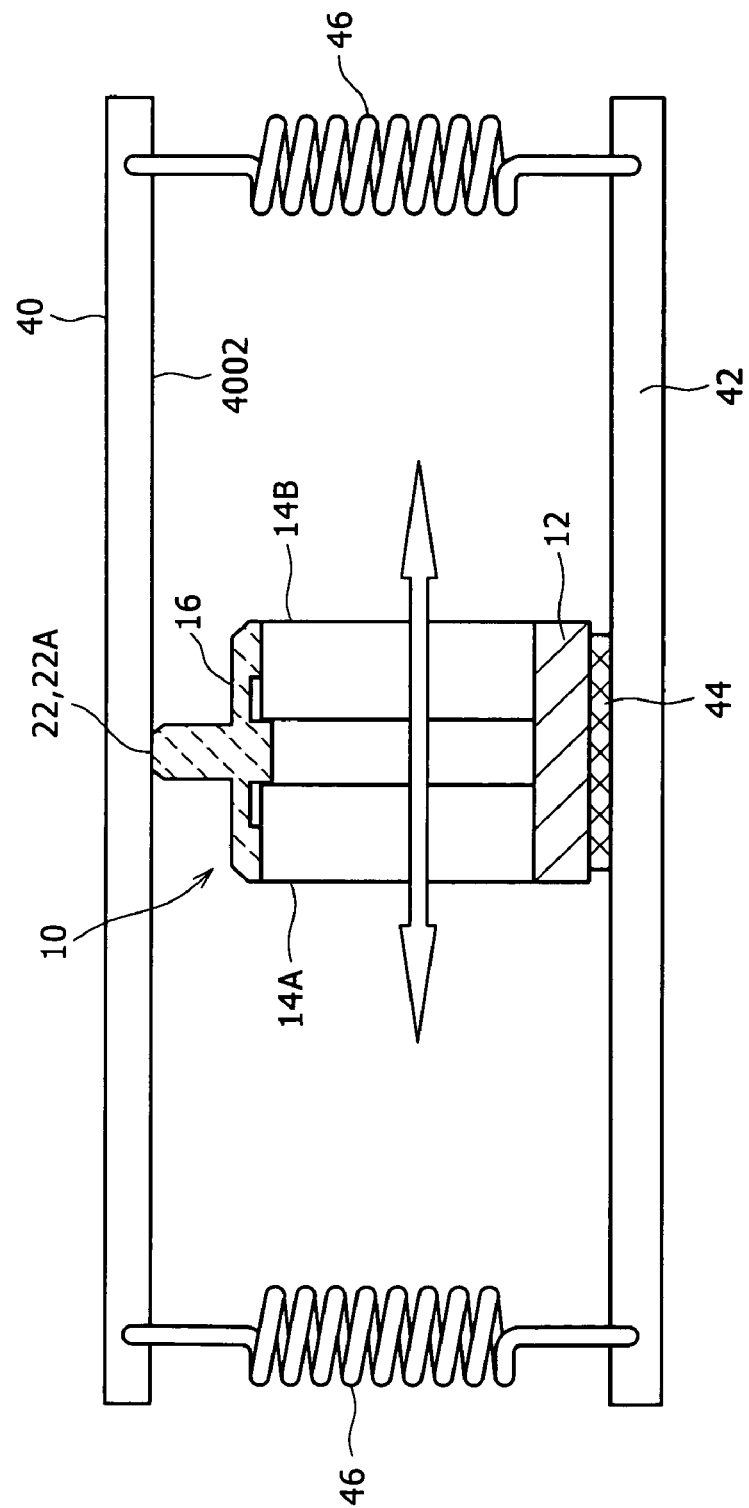
FIG. 8 is an elevational view of a vibratory driving device according to a fifth preferred embodiment of the present invention.

FIG. 8 is an elevational view of the vibratory driving device 10 and its associated parts according to the fifth preferred embodiment.

As shown in FIG. 8, the driven member 40 and a pressure rail 42 are flat plate members, and extend in parallel to each other at a given interval. The driven member 40 has an inner surface 4002 opposed to the pressure rail 42.

Two coil springs 46 are provided under extension at the opposite ends of the driven member 40 and the opposite ends of the pressure rail 42 so as to bias the driven member 40 and the pressure rail 42 toward each other.

A sliding surface member 44 is formed on the lower surface of the base 12 of the vibratory driving device 10. The sliding surface member 44 is formed of a material having a low coefficient of friction, such as a resin material.

The vibratory driving device 10 is movably interposed between the driven member 40 and the pressure rail 42 in such a manner that the upper end 22A of the projecting portion 22 abuts against the inner surface 4002 of the driven member 40 and the sliding surface member 44 abuts against the pressure rail 42 in the condition where the first and second support members 14A and 14B extend in a direction perpendicular to the driven member 40 and the pressure rail 42 and are arranged in the longitudinal direction of the driven member 40 and the pressure rail 42.

As in the first preferred embodiment, the drive signals SA and SB are respectively supplied to the support members 14A and 14B of the vibratory driving device 10, thereby circularly or elliptically vibrating the projecting portion 22, so that the vibratory driving device 10 can be linearly moved along the driven member 40 so as to be guided between the driven member 40 and the pressure rail 42 as shown by the double-headed arrow in FIG. 8.

In the fifth preferred embodiment, the coil springs 46 and the pressure rail 42 constitute pressure applying section configured to bring the driven member 40 into pressure contact with the projecting portion 22.

According to the fifth preferred embodiment, effects similar to those of the first preferred embodiment can be exhibited. Moreover, the vibratory driving device 10 itself can move, so that the flexibility of layout of the vibratory driving device 10 and the driven member 40 can be ensured.

Further, the projecting portion 22 and the driven member 40 are kept in pressure contact with each other by the pressure applying section, so that the motion of the vibratory driving device 10 due to the circular or elliptical vibration of the projecting portion 22 can be reliably produced.

Even in the condition that the drive signals are not supplied to the support members 14, the projecting portion 22 and the driven member 40 are kept in pressure contact with each other by the pressure applying section, thereby holding the vibratory driving device 10 in position. Accordingly, a power consumption can be reduced.

Thus, the projecting portion 22 and the driven member 40 are kept in pressure contact with each other by the pressure applying section. Accordingly, the motion of the vibratory driving device 10 is started simultaneously with starting of the circular or elliptical vibration of the projecting portion 22. That is no backlash is present and the responsiveness of the motion of the vibratory driving device 10 can therefore be improved.

Further, the pressure rail 42 is kept in pressure contact with the sliding surface member 44 to press the projecting portion 22 of the vibratory driving device 10 against the driven member 40. Accordingly, a frictional force between the pressure rail 42 can be reduced by the sliding surface member 44, thereby increasing the efficiency of the motion of the vibratory driving device 10.

While the coil springs 46 are used as a component of the pressure applying section in the fifth preferred embodiment, a leaf spring, magnetic spring, and elastic member and the like may be used.

Further, a cross roller guide (linear rolling bearing) or the like may be provided between the base 12 and the pressure rail 42 in place of the sliding surface member 44, thereby further reducing the frictional resistance due to the pressure applied to the vibratory driving device 10.

Sixth Preferred Embodiment

A sixth preferred embodiment of the present invention will now be described with reference to FIG. 9.

In the sixth preferred embodiment, the vibratory driving device 10 is applied to a lens moving mechanism moving a lens along the optical axis thereof in a lens barrel of an imaging device, for example.

Figure 9:
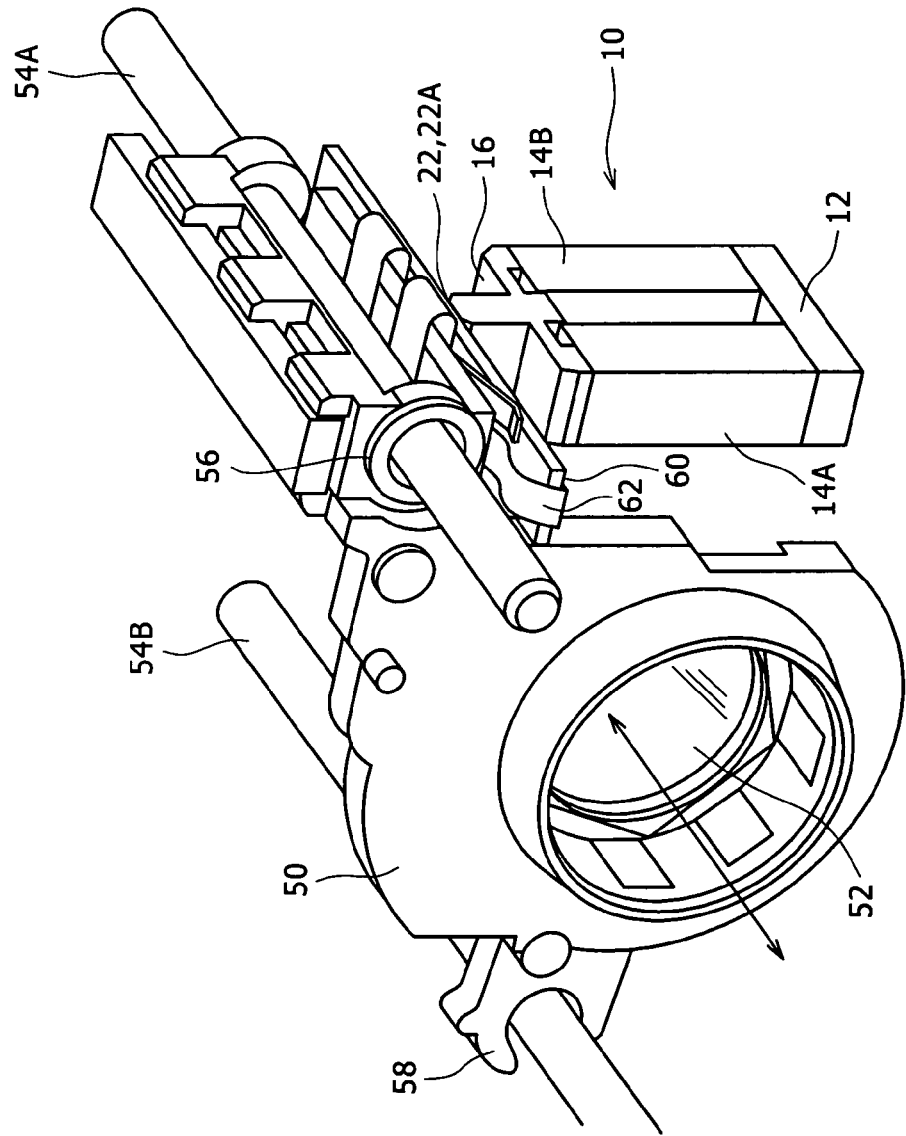
FIG. 9 is a perspective view showing a lens moving mechanism including a vibratory driving device according to a sixth preferred embodiment of the present invention.
Figure 10:
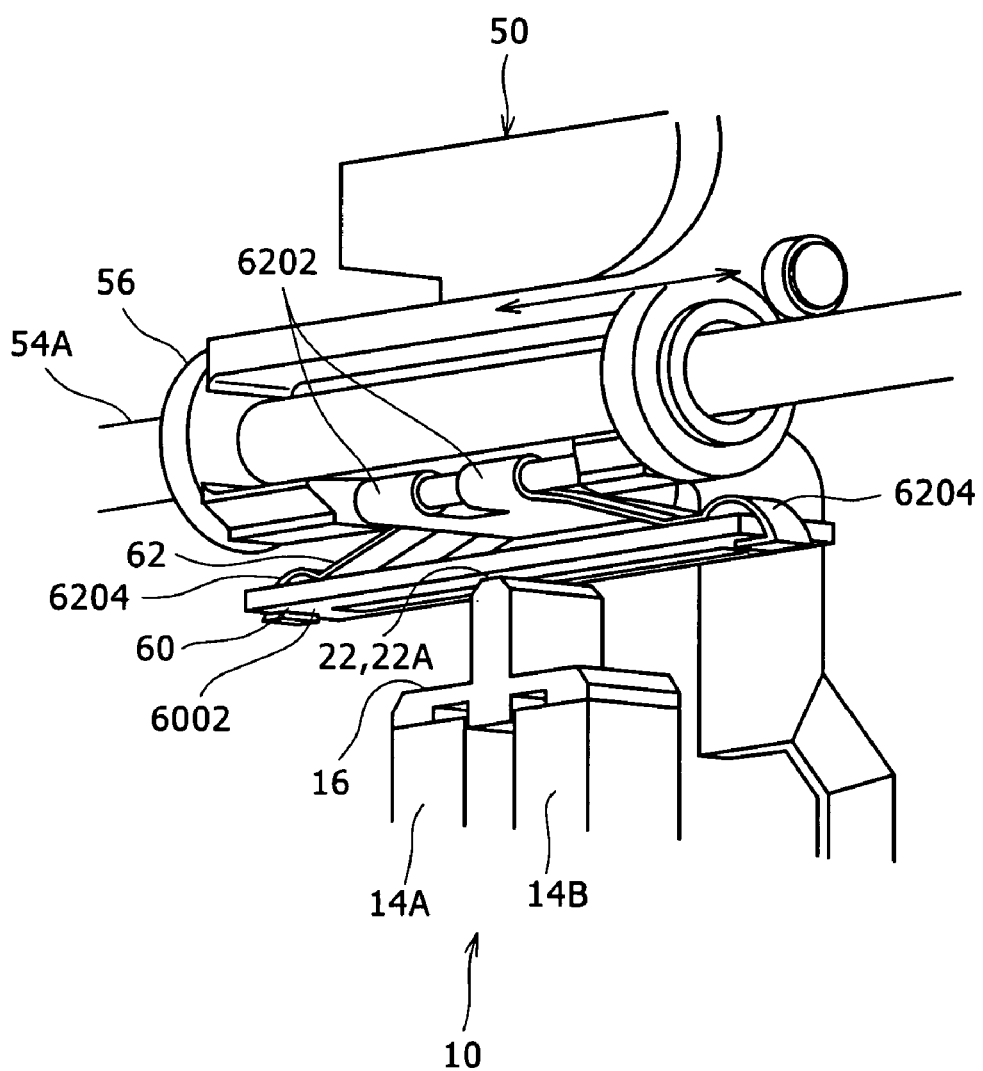
FIG. 10 is an enlarged perspective view of an essential part shown in FIG. 9.

FIG. 9 is a perspective view showing such a lens moving mechanism including the vibratory driving device 10 according to the sixth preferred embodiment, and FIG. 10 is an enlarged perspective view of an essential part shown in FIG. 9.

As shown in FIG. 9, the lens barrel contains a movable lens frame 50, a main guide shaft 54A, a subguide shaft 54B, and the vibratory driving device 10.

A lens 52 is held in the movable lens frame 50.

The movable lens frame 50 has a bearing portion 56 through which the main guide shaft 54A is inserted and an engaging portion 58 engaging with the subguide shaft 54B to thereby prevent the rotation of the movable lens frame 50 about the main guide shaft 54A.

The movable lens frame 50 is supported so as to be movable along the optical axis of the lens 52 in such a manner that the bearing portion 56 and the engaging portion 58 are respectively guided along the main guide shaft 54A and the subguide shaft 54B.

As shown in FIG. 10, a driven member 60 is mounted through a leaf spring 62 to the bearing portion 56.

The driven member 60 is a rectangular plate member having a thickness, a width larger than the thickness, and a length larger than the width.

The leaf spring 62 has two first lugs 6202 extending in a first direction and two second lugs 6204 extending in a second direction perpendicular to the first direction.

The first lugs 6202 are fixedly engaged with the bearing portion 56, and the driven member 60 is held at its longitudinally opposite ends to the second lugs 6204. The longitudinal direction of the driven member 60 is parallel to the axial direction of the main guide shaft 54A.

The driven member 60 has an upper surface opposed to the bearing portion 56 and a lower surface formed as a contact surface 6002 adapted to make contact with the projecting portion 22 of the vibratory driving device 10.

The vibratory driving device 10 shown in FIGS. 9 and 10 is held in such a manner the upper end 22A of the projecting portion 22 abuts against the contact surface 6002 of the driven member 60 in the condition where the first and second support members 14A and 14B extend in a direction perpendicular to the contact surface 6002 of the driven member 60 and are arranged in the longitudinal direction of the driven member 60 (the axial direction of the main guide shaft 54A).

The driven member 60 is biased toward the projecting portion 22 by a biasing force of the leaf spring 62, so that the contact surface 6002 of the driven member 60 is kept in elastic contact with the upper end 22A of the projecting portion 22, thereby bringing the driven member 60 into pressure contact with the upper end 22A of the projecting portion 22.

In the sixth preferred embodiment, the leaf spring 62 constitutes pressure applying section configured to bring the driven member 60 into pressure contact with the projecting portion 22.

As in the first preferred embodiment, the drive signals SA and SB are respectively supplied to the support members 14A and 14B of the vibratory driving device 10, thereby circularly or elliptically vibrating the projecting portion 22, so that the driven member 60 can be linearly reciprocated in the direction shown by the double-headed arrow in FIG. 10 to thereby move the movable lens frame 50 and the lens 52 along the optical axis thereof.

According to the sixth preferred embodiment, effects similar to those of the first preferred embodiment can be exhibited. Moreover, the projecting portion 22 and the driven member 60 are kept in pressure contact with each other by the pressure applying section, so that the motion of the driven member 60 due to the circular or elliptical vibration of the projecting portion 22 can be reliably produced.

Even in the condition that the drive signals are not supplied to the support members 14, the projecting portion 22 and the driven member 60 are kept in pressure contact with each other by the pressure applying section, thereby holding the movable lens frame 50 in position. Accordingly, a power consumption can be reduced.

Thus, the projecting portion 22 and the driven member 60 are kept in pressure contact with each other by the pressure applying section. Accordingly, the motion of the driven member 60 is started simultaneously with starting of the circular or elliptical vibration of the projecting portion 22. That is, no backlash is present and the responsiveness of the motion of the movable lens frame 50 can therefore be improved.

While the driven member 60 is biased toward the projecting portion 22 by the pressure applying section in the sixth preferred embodiment, the projecting portion 22 may be biased toward the driven member 60 by the pressure applying section.

Further, while the leaf spring 62 is used as the pressure applying section in the sixth preferred embodiment, a coil spring, magnetic spring, and elastic member and the like may be used.

Seventh Preferred Embodiment

A seventh preferred embodiment of the present invention will now be described with reference to FIG. 11.

The seventh preferred embodiment is a modification of the sixth preferred embodiment.

Figure 11:
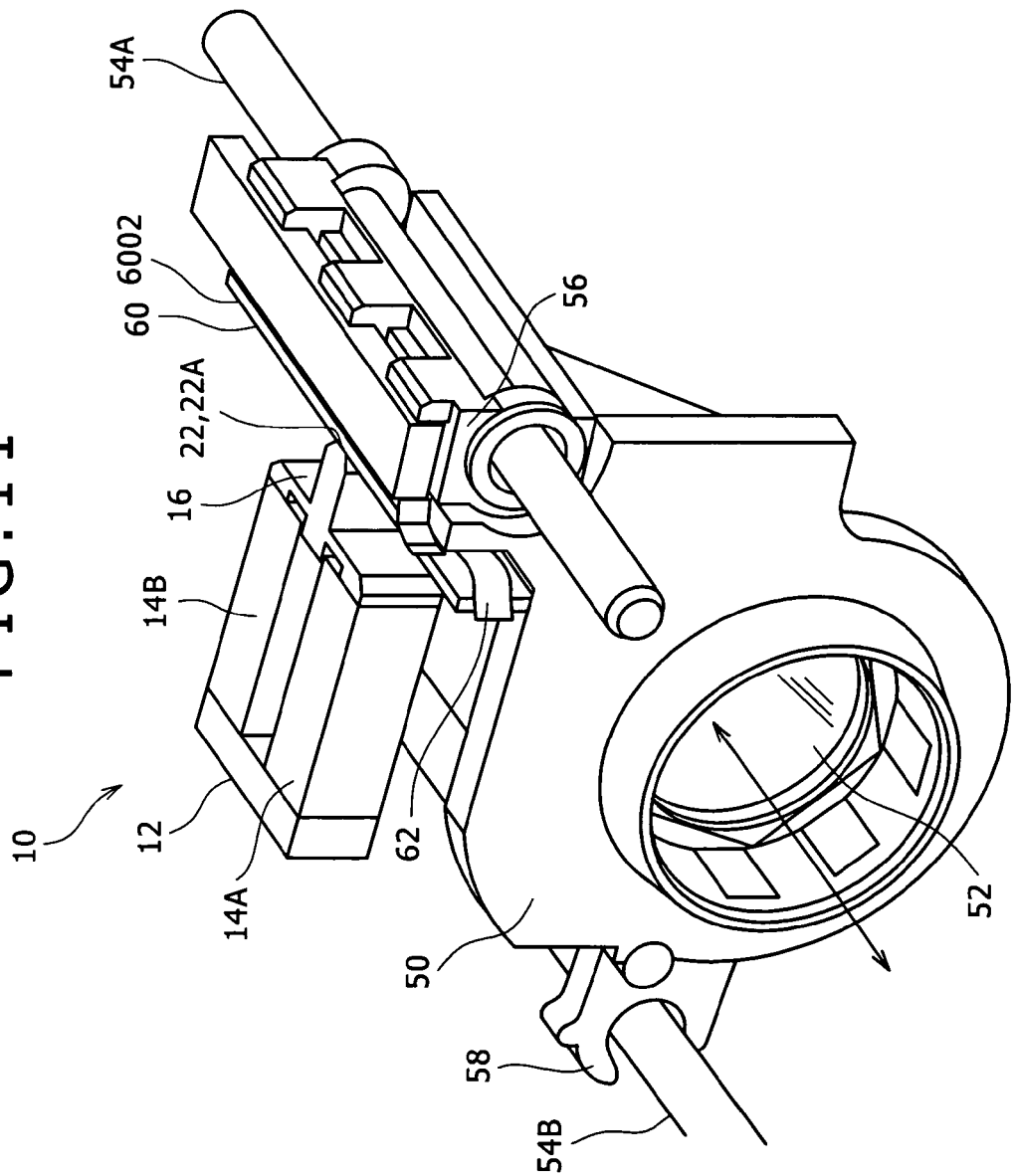
FIG. 11 is a perspective view showing a lens moving mechanism including a vibratory driving device according to a seventh preferred embodiment of the present invention.

FIG. 11 is a perspective view showing a lens moving mechanism including the vibratory driving device 10 according to the seventh preferred embodiment.

As shown in FIG. 11, the seventh preferred embodiment is different from the sixth preferred embodiment in the point that all of the vibratory driving device 10, the driven member 60, and the leaf spring 62 are located at a different rotational position about the axis of the main guide shaft 54A (e.g., a rotational position obtained by 90° C. clockwise rotating the position shown in FIG. 9). The other configuration is similar to that of the sixth preferred embodiment.

Also in the seventh preferred embodiment, effects similar to those of the sixth preferred embodiment can be exhibited.

Eighth Preferred Embodiment

An eighth preferred embodiment of the present invention will now be described with reference to FIG. 12.

In the eighth preferred embodiment, the vibratory driving device 10 is applied to a shake correcting mechanism moving a lens in a lens barrel of an imaging device, for example, in directions perpendicular to the optical axis of the lens.

Figure 12:
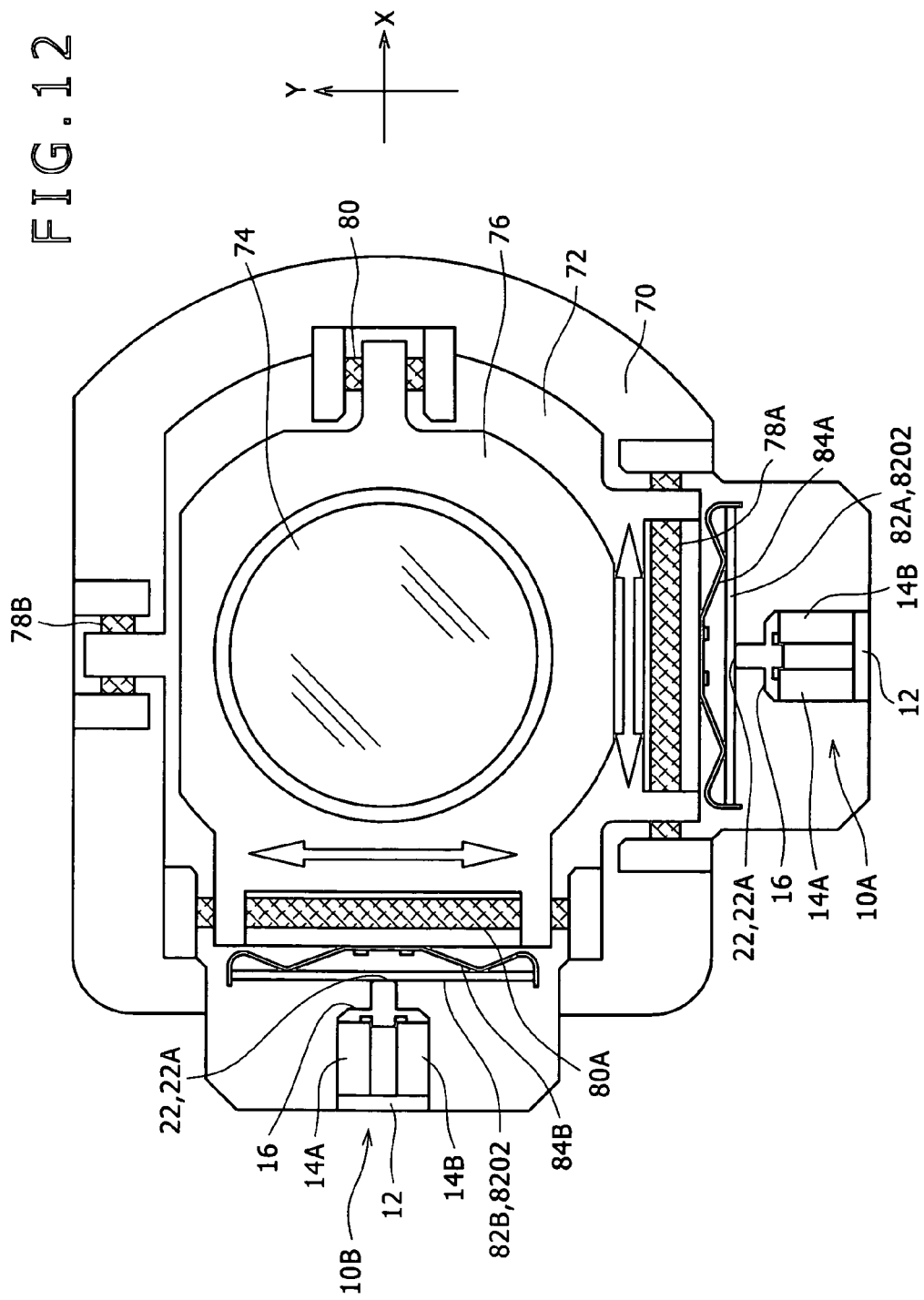
FIG. 12 is an elevational view showing a shake correcting mechanism including a vibratory driving device according to an eighth preferred embodiment of the present invention.

FIG. 12 is an elevational view showing such a shake correcting mechanism including the vibratory driving device 10 according to the eighth preferred embodiment.

As shown in FIG. 12, the lens barrel contains a fixed base 70, a movable base 72, a lens frame 76 for holding a lens 74, two first guide shafts 78A and 78B, two second guide shafts 80A and 80B, and first and second vibratory driving devices 10A and 10B.

For the convenience of illustration, two phantom axes orthogonal to each other in a plane perpendicular to the optical axis of the lens 74 will be referred to as an X axis and a Y axis.

The fixed base 70 is fixed to the lens barrel, and the movable base 72 is movably connected through the first guide shafts 78A and 78B to the fixed base 70 so as to be linearly reciprocatable in the direction of the X axis.

The lens frame 76 is movably connected through the second guide shafts 80A and 80B to the movable base 72 so as to be linearly reciprocatable in the direction of the Y axis.

Accordingly, the lens 74 held in the lens frame 76 is movable in an X-Y plane containing both the X axis and the Y axis.

A rectangular platelike driven member 82A extending in the direction of the X axis is supported through a leaf spring 84A to the movable base 72. The driven member 82A has a first surface opposed to the leaf spring 84A and a second surface formed opposite to the first surface as a contact surface 8202 adapted to make contact with the projecting portion 22 of the first vibratory driving device 10A.

The first vibratory driving device 10A is held to the fixed base 70 in such a manner that the upper end 22A of the projecting portion 22 of the first vibratory driving device 10A abuts against the contact surface 8202 of the driven member 82A in the condition where the first and second support members 14A and 14B of the first vibratory driving device 10A extend in a direction perpendicular to the contact surface 8202 of the driven member 82A and are arranged in the longitudinal direction of the driven member 82A (the direction of the X axis).

The driven member 82A is biased toward the projecting portion 22 of the first vibratory driving device 10A by a biasing force of the leaf spring 84A, so that the contact surface 8202 of the driven member 82A is kept in elastic contact with the upper end 22A of the projecting portion 22, thereby bringing the driven member 82A into pressure contact with the upper end 22A of the projecting portion 22.

Similarly, a rectangular platelike driven member 82B extending in the direction of the Y axis is supported through a leaf spring 84B to the movable lens frame 76. The driven member 82B has a first surface opposed to the leaf spring 84B and a second surface formed opposite to the first surface as a contact surface 8202 adapted to make contact with the projecting portion 22 of the second vibratory driving device 10B.

The second vibratory driving device 10B is held to the movable base 72 in such a manner that the upper end 22A of the projecting portion 22 of the second vibratory driving device 10B abuts against the contact surface 8202 of the driven member 82B in the condition where the first and second support members 14A and 14B of the second vibratory driving device 10B extend in a direction perpendicular to the contact surface 8202 of the driven member 82B and are arranged in the longitudinal direction of the driven member 82B (the direction of the Y axis).

The driven member 82B is biased toward the projecting portion 22 of the second vibratory driving device 10B by a biasing force of the leaf spring 84B, so that the contact surface 8202 of the driven member 82B is kept in elastic contact with the upper end 22A of the projecting portion 22, thereby bringing the driven member 82B into pressure contact with the upper end 22A of the projecting portion 22.

In the eighth preferred embodiment, the leaf springs 84A and 84B constitute pressure applying section configured to bring the driven members 82A and 82B into pressure contact with the projecting portions 22 of the first and second vibratory driving devices 10A and 10B, respectively.

As in the first preferred embodiment, the drive signals SA and SB are respectively supplied to the support members 14A and 14B of each of the first and second vibratory driving devices 10A and 10B, thereby circularly or elliptically vibrating the respective projecting portions 22, so that the driven members 82A and 82B can be linearly reciprocated in the directions shown by the double-headed arrows in FIG. 12 to thereby move the lens frame 76 and the lens 74 in the plane perpendicular to the optical axis.

According to the eighth preferred embodiment, effects similar to those of the first preferred embodiment can be exhibited. Moreover, the projecting portions 22 of the first and second vibratory driving devices 10A and 10B and the driven members 82A and 82B are respectively kept in pressure contact with each other by the pressure applying section, so that the motions of the driven members 82A and 82B due to the circular or elliptical vibrations of the respective projecting portions 22 can be reliably produced.

Even in the condition that the drive signals are not supplied to the support members 14, the respective projecting portions 22 and the driven members 82A and 82B are kept in pressure contact with each other by the pressure applying section, thereby holding the lens frame 76 in position. Accordingly, a power consumption can be reduced.

Thus, the respective projecting portions 22 and the driven members 82A and 82B are kept in pressure contact with each other by the pressure applying section. Accordingly, the motions of the driven members 82A and 82B are started simultaneously with starting of the circular or elliptical vibrations of the respective projecting portions 22. That is, no backlash is present and the responsiveness of the motion of the lens frame 76 can therefore be improved.

While the driven members 82A and 82B are biased toward the respective projecting portions 22 by the pressure applying section in the eighth preferred embodiment, the respective projecting portions 22 may be biased toward the driven members 82A and 82B by the pressure applying section.

Further, while the leaf springs 84A and 84B are used as the pressure applying section in the eighth preferred embodiment, a coil spring, magnetic spring, and elastic member and the like may be used.

Further, all of the first vibratory driving device 10A, the driven member 82A, and the leaf spring 84A may be located at a different rotational position about the axis of the first guide shaft 78A. Similarly, all of the second vibratory driving device 10B, the driven member 82B, and the leaf spring 84B may be located at a different rotational position about the axis of the second guide shaft 80A.

Further, while the lens frame 76 is moved in the directions of the X and Y axes in the eighth preferred embodiment, an imaging element may be moved in the directions of the X and Y axes by using a similar configuration. Also in this case, similar effects can be exhibited.

Ninth Preferred Embodiment

A ninth preferred embodiment of the present invention will now be described with reference to FIG. 13.

In the ninth preferred embodiment, the vibratory driving device 10 is applied to a diaphragm mechanism limiting a light quantity in a lens barrel of an imaging device, for example.

Figure 13:
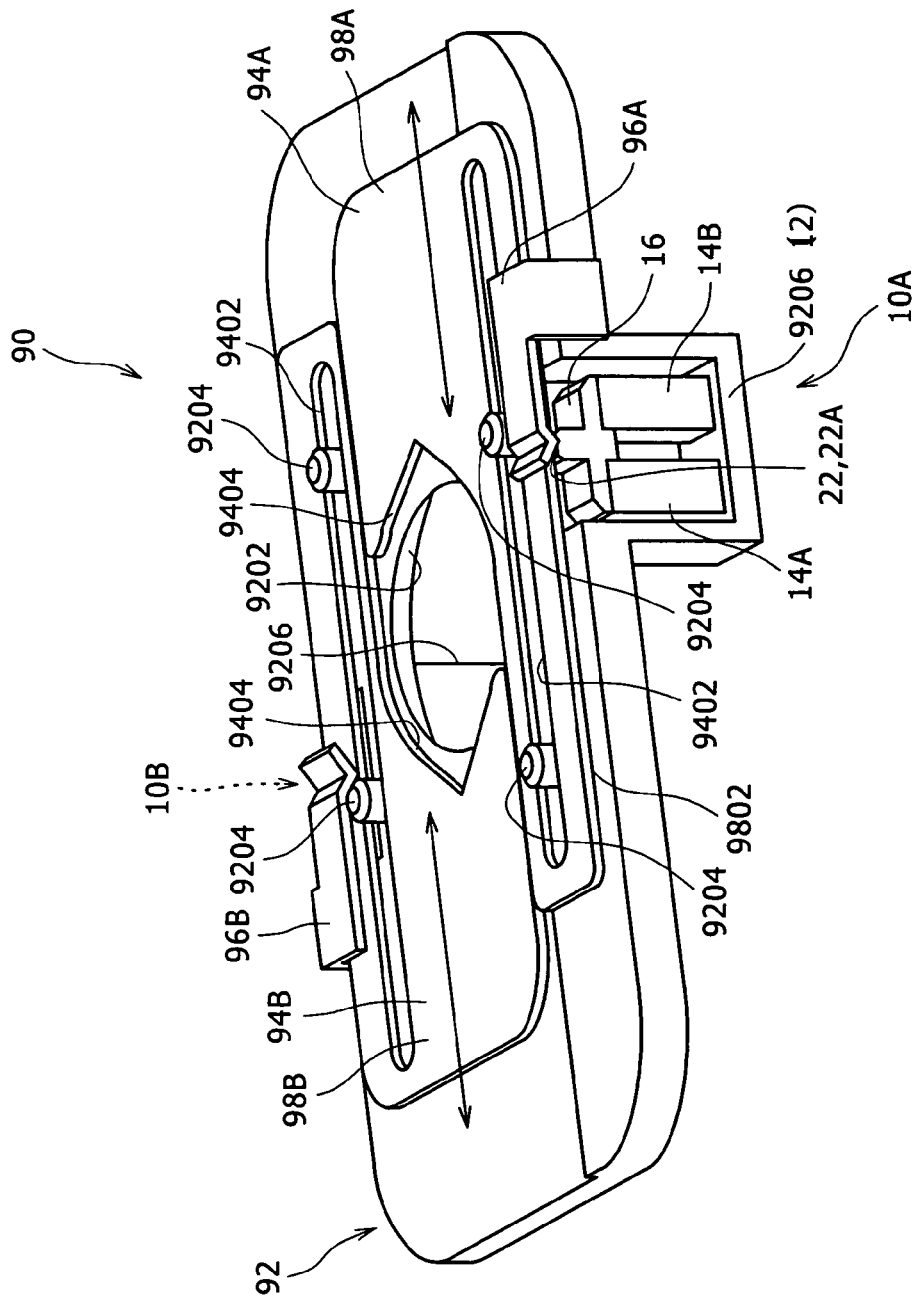
FIG. 13 is a perspective view showing a diaphragm mechanism including a vibratory driving device according to a ninth preferred embodiment of the present invention.

FIG. 13 is a perspective view showing such a diaphragm mechanism 90 including the vibratory driving device 10 according to the ninth preferred embodiment.

As shown in FIG. 13, the diaphragm mechanism 90 includes a platelike base 92, first and second diaphragm members 94A and 94B, first and second leaf springs 96A and 96B, and first and second vibratory driving devices 10A and 10B.

The base 92 extends in a direction perpendicular to an optical axis in the lens barrel. The base 92 is formed with an opening 9202. A plurality of guide pins 9204 project from the upper surface of the base 92. Each of the first and second diaphragm members 94A and 94B is formed with a guide slot 9402 through which the guide pins 9204 are inserted. The guide slots 9402 of the first and second diaphragm members 94A and 94B are guided by the guide pins 9204 of the base 92, so that the first and second diaphragm members 94A and 94B are movably supported on the upper surface of the base 92 so as to be reciprocatable in the direction perpendicular to the optical axis.

Each of the first and second diaphragm members 94A and 94B is formed with a recess 9404 at a position above the opening 9202. The recesses 9404 of the first and second diaphragm members 94A and 94B are opposed to each other.

By moving the first and second diaphragm members 94A and 94B in the opposite directions so as to come away from or toward each other, the area of an aperture defined by the opposed recesses 9404 can be increased or decreased.

In the ninth preferred embodiment, the first and second diaphragm members 94A and 94B constitute first and second driven members 98A and 98B, respectively, and the lower surfaces of the first and second diaphragm members 94A and 94B opposed to the upper surface of the base 92 constitute contact surfaces 9802 of the first and second driven members 98A and 98B, respectively.

The first vibratory driving device 10A is provided in a recess 9206 formed on the lower side of the base 92.

The first vibratory driving device 10A is held to the bottom of the recess 9206 of the base 92 in such a manner that the upper end 22A of the projecting portion 22 abuts against the contact surface 9802 of the first driven member 98A in the condition where the first and second support members 14A and 14B extend in a direction perpendicular to the contact surface 9802 of the first driven member 98A and are arranged in the longitudinal direction of the first driven member 98A (the direction of reciprocating motion of the first driven member 98A). In the ninth preferred embodiment, the bottom of the recess 9206 serves also as the base 12 of the first vibratory driving device 10A.

The first leaf spring 96A is mounted on the base 92 so as to bias the first driven member 98A at a portion opposed to the projecting portion 22 toward the projecting portion 22. Accordingly, the first driven member 98A is biased toward the projecting portion 22 of the first vibratory driving device 10A by a biasing force of the first leaf spring 96A, so that the contact surface 9802 of the first driven member 98A is kept in elastic contact with the upper end 22A of the projecting portion 22, thereby bringing the first driven member 98A into pressure contact with the upper end 22A of the projecting portion 22.

Like the first vibratory driving device 10A, the second vibratory driving device 10B is provided so as to be opposed to the second diaphragm member 94B as the second driven member 98B.

In the ninth preferred embodiment, the first and second leaf springs 96A and 96B constitute pressure applying section configured to bring the first and second driven members 98A and 98B into pressure contact with the projecting portions 22 of the first and second vibratory driving devices 10A and 10B, respectively.

As in the first preferred embodiment, the drive signals SA and SB are respectively supplied to the support members 14A and 14B of each of the first and second vibratory driving devices 10A and 10B, thereby circularly or elliptically vibrating the respective projecting portions 22, so that the first and second driven members 98A and 98B can be linearly reciprocated in the directions shown by the double-headed arrows in FIG. 13 to thereby move the first and second diaphragm members 94A and 94B away from or toward each other and accordingly increase or decrease the area of the diaphragm.

According to the ninth preferred embodiment, effects similar to those of the first preferred embodiment can be exhibited. Moreover, the projecting portions 22 of the first and second vibratory driving devices 10A and 10B and the first and second driven members 98A and 98B are respectively kept in pressure contact with each other by the pressure applying section, so that the motions of the first and second driven members 98A and 98B due to the circular or elliptical vibrations of the respective projecting portions 22 can be reliably produced.

Even in the condition that the drive signals are not supplied to the support members 14, the respective projecting portions 22 and the first and second driven members 98A and 98B are kept in pressure contact with each other by the pressure applying section, thereby holding the first and second diaphragm members 94A and 94B in position. Accordingly, a power consumption can be reduced.

Thus, the respective projecting portions 22 and the first and second driven members 98A and 98B are kept in pressure contact with each other by the pressure applying section. Accordingly, the motions of the first and second driven members 98A and 98B are started simultaneously with starting of the circular or elliptical vibrations of the respective projecting portions 22. That is, no backlash is present and the responsiveness of the motions of the first and second diaphragm members 94A and 94B can therefore be improved.

While the first and second driven members 98A and 98B are biased toward the respective projecting portions 22 by the pressure applying section in the ninth preferred embodiment, the respective projecting portions 22 may be biased toward the first and second driven members 98A and 98B by the pressure applying section.

Further, while the first and second leaf springs 96A and 96B are used as the pressure applying section in the ninth preferred embodiment, a coil spring, magnetic spring, and elastic member and the like may be used.

Further, while the first and second diaphragm members 94A and 94B are linearly reciprocated to thereby open or close the diaphragm in the ninth preferred embodiment, a driven member on which an optical filter is mounted may be linearly reciprocated in a direction perpendicular to an optical axis like the first and second diaphragm members 94A and 94B to thereby construct a mechanism for loading and unloading the optical filter.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

The invention claimed is:

1. An exciting method for an elastic vibration member comprising:
    arranging two support members each formed from an electro-mechanical energy transducer;
    supporting said elastic vibration member to said two support members at their front ends; and
    supplying drive signals having the same frequency and a phase difference to said two support members, circularly or elliptically vibrating said elastic vibration member,
    wherein said elastic vibration member has a body plate portion and a projecting portion, said projecting portion being formed on an upper surface of said body plate portion at its longitudinally central position, and a lower surface of said body plate portion at its longitudinally opposite ends being supported to said two support members, and
    wherein a thin-walled portion is formed between said projecting portion and each of the longitudinally opposite ends of said body plate portion.

2. The exciting method for the elastic vibration member according to claim 1, wherein:
    said two support members comprise two columnar members extending in parallel to each other;
    said two support members being supported at their first longitudinal ends to a base.

3. The exciting method for the elastic vibration member according to claim 1, wherein:
    said two support members comprise two columnar members;
    said two support members being excited in a stretch mode where they are expanded and contracted in their longitudinal direction by the input of said drive signals.

4. The exciting method for the elastic vibration member according to claim 1, wherein:
    said two support members comprise two columnar members;
    said two support members being excited in a stretch mode where they are expanded and contracted in their longitudinal direction by the input of said drive signals;
    the same frequency of said drive signals being set near a resonant frequency in said stretch mode.

5. The exciting method for the elastic vibration member according to claim 1, wherein said phase difference is set to 90 degrees.

6. The exciting method for the elastic vibration member according to claim 1, wherein said electro-mechanical energy transducer comprises a stacked piezoelectric element.

7. A vibratory driving device comprising:
    a base;
    two support members supported to said base, each of said two support members being formed from an electro-mechanical energy transducer;
    an elastic vibration member supported to said two support members at their front ends; and
    control means for inputting drive signals having the same frequency and a phase difference to said two support members,
    wherein said elastic vibration member has a body plate portion and a projecting portion, said projecting portion being formed on an upper surface of said body plate portion at its longitudinally central position, and a lower surface of said body plate portion at its longitudinally opposite ends being supported to said two support members, and
    wherein a thin-walled portion is formed between said projecting portion and each of the longitudinally opposite ends of said body plate portion.

8. The vibratory driving device according to claim 7, wherein said two support members are arranged at a given interval.

9. The vibratory driving device according to claim 7, wherein said phase difference is set to 90 degrees.

10. The vibratory driving device according to claim 7, wherein:
    said two support members comprise two columnar members extending in parallel to each other;
    said two support members being supported at their first longitudinal ends to said base.

11. The vibratory driving device according to claim 10, wherein said two support members have the same sectional shape and the same length.

12. The vibratory driving device according to claim 10, wherein:
    said body plate portion having a thickness, a width larger than said thickness, and a length larger than said width.

13. A vibratory driving device comprising:
    a base;
    two support members supported to said base, each of said two support members being formed from an electro-mechanical energy transducer;
    an elastic vibration member supported to said two support members at their front ends; and control means for inputting drive signals having the same frequency and a phase difference to said two support members, wherein said two support members comprise two columnar members extending in parallel to each other, said two support members being supported at their first longitudinal ends to said base, and said elastic vibration member being supported at its opposite side portions to the second longitudinal ends of said two support members, wherein said elastic vibration member has a body plate portion and a projecting portion, said body plate portion having a thickness, a width larger than said thickness, and a length larger than said width, said projecting portion being formed on the upper surface of said body plate portion at its longitudinally central position, and the lower surface of said body plate portion at its longitudinally opposite ends being supported to said two support members, and wherein a thin-walled portion is formed between said projecting portion and each of the longitudinally opposite ends of said body plate portion.

14. A vibratory driving device comprising:

a base;

two support members supported to said base, each of said two support members being formed from an electro-mechanical energy transducer;

an elastic vibration member supported to said two support members at their front ends; and control means for inputting drive signals having the same frequency and a phase difference to said two support members, wherein said two support members comprise two columnar members extending in parallel to each other, said two support members being supported at their first longitudinal ends to said base, and said elastic vibration member being supported at its opposite side portions to the second longitudinal ends of said two support members, wherein said elastic vibration member has a body plate portion and a projecting portion, said body plate portion having a thickness, a width larger than said thickness, and a length larger than said width, said projecting portion being formed on the upper surface of said body plate portion at its longitudinally central position, and the lower surface of said body plate portion at its longitudinally opposite ends being supported to said two support members, and wherein a recess is formed on the lower surface of said body plate portion at a position between said projecting portion and each of the longitudinally opposite ends of said body plate portion, thereby forming a thin-walled portion at the position corresponding to said recess.

15. A vibratory driving device comprising:

a base;

two support members supported to said base, each of said two support members being formed from an electro-mechanical energy transducer;

an elastic vibration member supported to said two support members at their front ends; and control means for inputting drive signals having the same frequency and a phase difference to said two support members, wherein said two support members comprise two columnar members extending in parallel to each other, said two support members being supported at their first longitudinal ends to said base, and said elastic vibration member being supported at its opposite side portions to the second longitudinal ends of said two support members, wherein said elastic vibration member has a body plate portion and a projecting portion, said body plate portion having a thickness, a width larger than said thickness, and a length larger than said width, said projecting portion being formed on the upper surface of said body plate portion at its longitudinally central position, and the lower surface of said body plate portion at its longitudinally opposite ends being supported to said two support members, and wherein a projection is formed on the lower surface of said body plate portion at the position corresponding to said projecting portion so as to project opposite to said projecting portion; and said projection being sandwiched between said two support members to thereby position said elastic vibration member relative to said two support members.

16. The vibratory driving device according to claim 7, wherein said electro-mechanical energy transducer comprises a stacked piezoelectric element.

17. A vibratory driving device comprising:

a base;

two support members supported to said base and extending in parallel to each other, each of said two support members being formed from an electro-mechanical energy transducer;

an elastic vibration member supported to said two support members at their front ends;

control means for inputting drive signals having the same frequency and a phase difference to said two support members;

said elastic vibration member being formed with a projecting portion at a position between the front ends of said two support members, said projecting portion projecting on one side of said elastic vibration member opposite to the other side where said two support members are arranged;

a driven member being supported in opposed relationship to said projecting portion so as to be movable in a plane perpendicular to the longitudinal direction of said two support members;

said vibratory driving device further including pressure applying means for bringing said driven member into pressure contact with said projecting portion, wherein said elastic vibration member further includes a body plate portion, wherein said projecting portion is formed on an upper surface of said body plate portion at its longitudinally central position, and a lower surface of said body plate portion at its longitudinally opposite ends being supported to said two support members, and wherein a thin-walled portion is formed between said projecting portion and each of the longitudinally opposite ends of said body plate portion.

18. The vibratory driving device according to claim 17, wherein:

said driven member has a thickness in the longitudinal direction of said support members;

said projecting portion abuts against one surface of said driven member in the direction of the thickness of said driven member; and said pressure applying means includes a contact surface abutting against the other surface of said driven member in the direction of the thickness of said driven member at a position corresponding to said projecting portion and means for biasing said contact surface toward said projecting portion.

19. The vibratory driving device according to claim 18, wherein the other surface of said driven member is covered with a material having a low coefficient of friction.

20. The vibratory driving device according to claim 17, wherein said electro-mechanical energy transducer comprises a stacked piezoelectric element.

21. A vibratory driving device movably supported between a driven member and a pressure rail extending in parallel to each other, comprising:
- a base kept in slidable contact with said pressure rail;
- two support members supported to said base and extending in parallel to each other in a direction perpendicular to the longitudinal direction of said driven member and said pressure rail;
- an elastic vibration member supported to said two support members at their front ends; and
- control means for inputting drive signals having the same frequency and a phase difference to said two support members;
- said elastic vibration member being formed with a projecting portion at a position between the front ends of said two support members, said projecting portion projecting toward said driven member; and
- said vibratory driving device further including pressure applying means for bringing said driven member into pressure contact with said projecting portion,
- wherein said elastic vibration member further includes a body plate portion,
- wherein said projecting portion is formed on an upper surface of said body plate portion at its longitudinally central position, and a lower surface of said body plate portion at its longitudinally opposite ends being supported to said two support members, and
- wherein a thin-walled portion is formed between said projecting portion and each of the longitudinally opposite ends of said body plate portion.

22. The vibratory driving device according to claim 21, wherein said pressure applying means includes a coil spring connected between said driven member and said pressure rail so as to bias said driven member and said pressure rail toward each other.

23. The vibratory driving device according to claim 21, wherein said electro-mechanical energy transducer comprises a stacked piezoelectric element.

* * * * *